United States Patent [19]

Buccicone

[11] 4,218,942
[45] Aug. 26, 1980

[54] INCH/METRIC THREAD DIAL

[75] Inventor: Dana F. Buccicone, Battle Creek, Mich.

[73] Assignee: South Bend Lathe, South Bend, Ind.

[21] Appl. No.: 37,433

[22] Filed: May 9, 1979

[51] Int. Cl.³ .......................... B23B 21/00; B23B 1/00
[52] U.S. Cl. ................................................ 82/22; 82/5
[58] Field of Search ........................................ 82/5, 22

[56] References Cited

U.S. PATENT DOCUMENTS

| 602,924 | 4/1898 | Wheeler | 82/22 |
| 1,520,494 | 12/1924 | Drake | 82/22 |
| 2,501,281 | 3/1950 | Longstreet | 82/22 |
| 2,572,759 | 10/1951 | Ritter | 82/5 |

Primary Examiner—Harrison L. Hinson
Attorney, Agent, or Firm—Oltsch, Knoblock & Hall

[57] ABSTRACT

A thread dial for use on English system engine lathes when cutting English or Metric threads.

10 Claims, 10 Drawing Figures

Fig. 10

INCH/MM THREAD DIAL INDEX PLATE

| LEAD (MM) | THREAD DIAL SETTING | ENGAGE AT | LEAD (MM) | THREAD DIAL SETTING | ENGAGE AT |
|---|---|---|---|---|---|
| 18 | I-H | 1 | 2.0 | I-F | ANY LINE |
| 16 | — | — | 1.8 | I-E | ANY LINE |
| 14 | I-D | 1 | 1.75 | I-D | ANY LINE |
| 11 | I-K | 1-3 | 1.6 | I-C | ANY LINE |
| 10 | I-J | 1-3 | 1.5 | II-L | 1-3 |
| 9.6 | I-I | 1-3 | 1.4 | II-B | 1 |
| 9.0 | I-H | 1-3 | 1.375 | I-K | ANY LINE |
| 8.8 | I-G | 1-3 | 1.25 | II-J | 1-3 |
| 8.0 | I-F | 1 | 1.2 | II-I | 1-3 |
| 7.2 | I-E | 1-3 | 1.125 | I-H | ANY LINE |
| 7.0 | I-D | 1-3 | 1.1 | II-G | 1-3 |
| 6.4 | I-C | 1-3 | 1.0 | II-F | 1-3 |
| 6.0 | I-L | 1-2-3-4 | .9 | II-E | 1-3 |
| 5.6 | I-B | 1-3 | .875 | I-D | ANY LINE |
| 5.5 | I-K | 1-2-3-4 | .8 | II-C | 1-3 |
| 5.0 | I-J | 1-2-3-4 | .75 | II-L | 1-2-3-4 |
| 4.8 | I-I | 1-2-3-4 | .7 | I-B | ANY LINE |
| 4.5 | I-H | 1-2-3-4 | .625 | II-J | 1-3 |
| 4.4 | I-G | 1-2-3-4 | .6 | II-I | 1-2-3-4 |
| 4.0 | I-F | 1-3 | .55 | II-G | 1-2-3-4 |
| 3.6 | I-E | 1-2-3-4 | .5 | II-F | 1-2-3-4 |
| 3.5 | I-D | 1-2-3-4 | .45 | II-E | 1-2-3-4 |
| 3.2 | I-C | 1-2-3-4 | .4 | II-C | 1-2-3-4 |
| 3.0 | I-L | ANY LINE | .375 | II-L | 1-2-3-4 |
| 2.8 | I-B | 1-2-3-4 | .35 | II-B | 1-2-3-4 |
| 2.75 | I-K | ANY LINE | .3 | II-I | ANY LINE |
| 2.5 | I-J | ANY LINE | .25 | II-F | ANY LINE |
| 2.4 | I-I | ANY LINE | .225 | II-E | 1-2-3-4 |
| 2.25 | I-H | ANY LINE | .2 | II-C | 1-2-3-4 |
| 2.2 | I-G | ANY LINE | | | |

NOTE:
FOR ENGLISH OPERATION USE SETTING II-A.
ZERO THREAD DIAL PRIOR TO USE, EVEN THREADS ENGAGE AT ANY LINE ODD THREADS ENGAGE AT ANY NUMBERED LINE.

INCH/METRIC THREAD DIAL

SUMMARY OF THE INVENTION

This invention relates to a thread dial for engine lathes and with particular application to inch and metric threads.

In the thread dial of this invention a worm wheel engages the lead screw of the lathe. A gear train having a multiplicity of selectively engageable gear ratios is provided between the worm gear and an indicator dial. By the use of this invention English or Metric series screw threads may be cut with English or Metric system lathes. The thread dial will indicate the proper relationship of the lead screw and the work piece upon which the threads are to be cut. When this proper relationship exists, the half nuts may be caused to engage the lead screw and the cutting tool to traverse longitudinally over the work piece thereby cutting the desired thread.

Accordingly, it is an object of this invention to provide a thread dial for use on engine lathes which are built to one system of measurement and which will allow the lathe to cut the screw threads of that system or of a different system of measurement.

Another object is to provide a thread dial with a multiplicity of gear ratios between the lead screw pickup gear and the indicator of the dial.

Another object is to provide a versatile thread dial which will indicate when the proper relationship of spindle to lead screw exists.

Other objects will be apparent from the following description.

BRIEF DESCRIPTION OF THE DRAWINGS

FIG. 10 is a plate chart for attachment to the lathe and showing the required thread dial settings and appropriate half-nut engagement positions to be used when cutting various pitch series of Metric threads on an English system lathe equipped with this invention.

DESCRIPTION OF THE PREFERRED EMBODIMENT

The preferred embodiment illustrated is not intended to be exhaustive or to limit the invention to the precise form disclosed. It is chosen and described in order to explain the principles of the invention and its application and practical use to thereby enable others skilled in the art to best utilize the invention.

Figure 1:
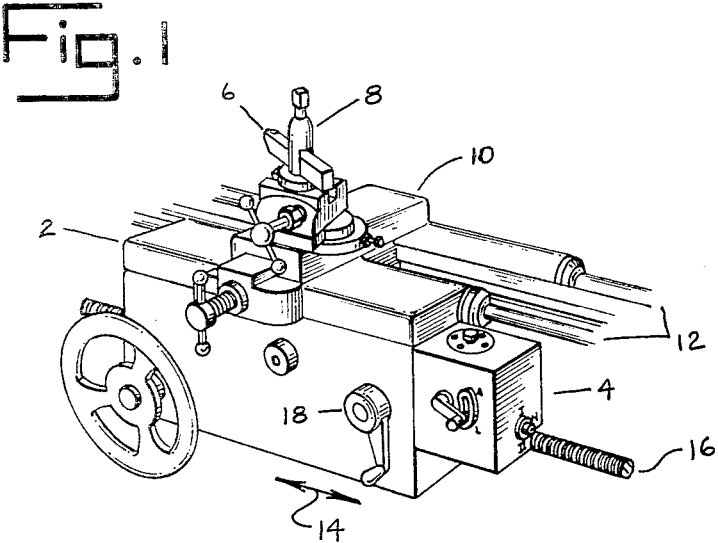
FIG. 1 is a partial perspective view of the tool carriage or saddle of an engine lathe having one embodiment of this invention installed thereon.

With reference to FIG. 1, the tool carriage 2 of a typical engine lathe is shown carrying the thread dial 4 of this invention. A tool 6 is held in tool post 8 carried upon cross slide 10. Carriage 2 moves longitudinally to the lathe on ways 12 in the directions illustrated by arrows 14. Lead screw 16 is power driven. Half-nuts (not shown), located within carriage 2 and controlled by lever 18 engage lead screw 16 to cause carriage 2 to move longitudinally along ways 12. In the cutting of threads on an engine lathe, lead screw 16 is geared to the lathe spindle through appropriate change gearing. Lead screw 16 is thereby caused to rotate at a speed with respect to the lathe spindle that corresponds to the ratio of the thread pitch of lead screw 16 to the pitch of the thread to be cut. Cutting tool 6 is brought into engagement with the work piece and the half-nuts are engaged with the lead screw 16 by lever 18. As the lathe spindle and work piece (not shown) rotate, carriage 2 is moved along ways 12 so as to cause tool 6 to follow a helical path along the work piece. After the first cut is completed, the half-nuts are disengaged, the tool is disengaged from the work piece, and carriage 2 is moved back along the ways to a position near its starting point. For the next and successive cuts that are necessary to finish the screw thread, carriage 2 must be engaged by the half-nuts to lead screws 16 when the correct rotational relationship exists between the spindle and lead screw 16 to cause the cutting tool 6 to follow the same path which it had followed on the first cut. Thread dials for indicating when the proper relationship exists are well known in the engine lathe thread cutting art. Thread dials visually indicate to the lathe operator when to engage the half-nuts for successive cuts.

An embodiment of this invention is shown in FIGS. 2-9. Thread dial 4 includes a worm wheel 20 which engages lead screw 16. A shaft 22 is fixedly attached to wheel 20 and is journaled for rotation within dial housing 23. A gear 24 and a gear 26 are fixedly attached to shaft 22. A shaft 28 has external gear teeth 29 formed along a portion of its length and is journaled for rotation within housing 23, paralleling shaft 22. A gear 30 is journaled for independent rotation on shaft 28 and engages gear 24. A gear 32 is likewise journaled for independent rotation on shaft 28 and engages gear 26. A yoke 34 is carried upon teeth 29 of shaft 28. Shaft 28 may rotate relative to yoke 34 with the yoke being shiftable longitudinally along the shaft. A gear 36 is rotatively carried by yoke 34 and engages teeth 29 of shaft 28. A shaft 38 having a multiplicity of spur gears 40 fixedly attached thereto is journaled for rotation within housing 23. Gear 36 may engage any selected one of spur gears 40 as yoke 34 is shifted along shaft 28. Indicator dial 42 is connected to the distal end of shaft 38. A thumb screw 44 allows the selected positioning of indicator dial 42 with respect to shaft 38 and serves when tightened to secure the dial to the shaft.

Figure 2:
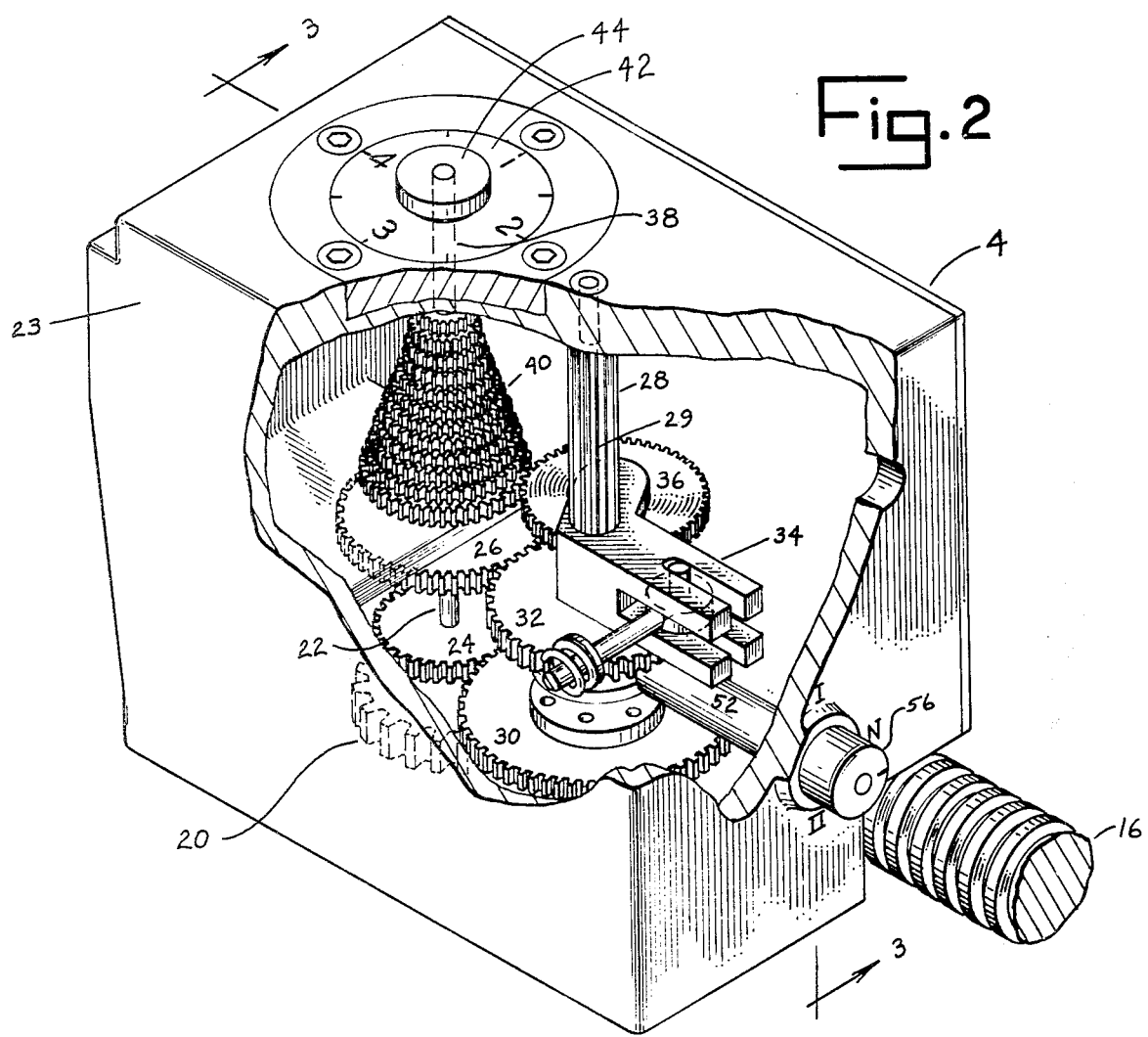
FIG. 2 is a perspective view of the invention having a portion thereof broken away for purposes of illustration.
Figure 3:
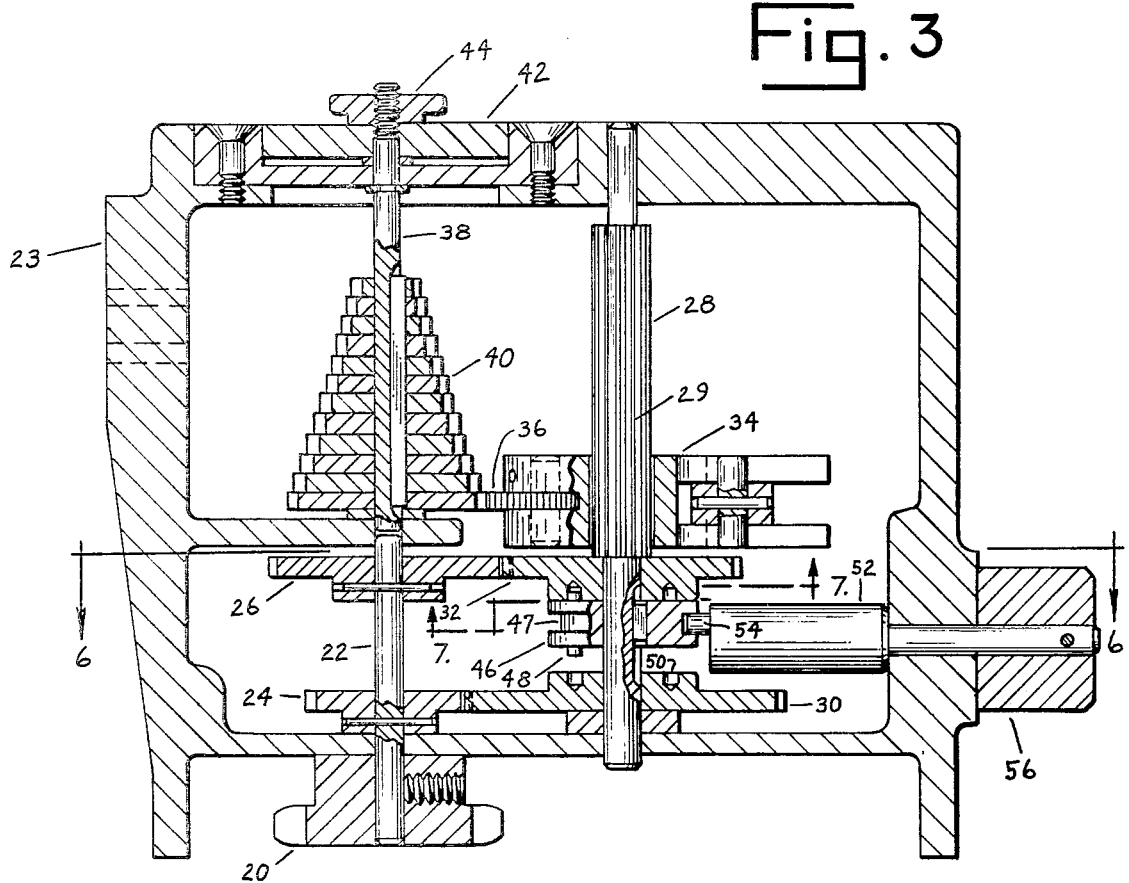
FIG. 3 is a sectional view taken along the line 3—3 of FIG. 2 and showing the positive clutch in its first operative position.
Figure 4:
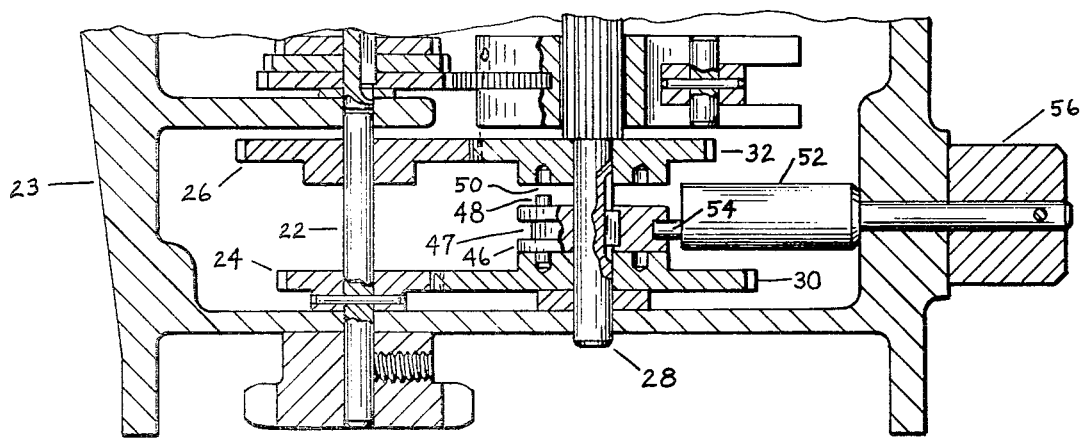
FIG. 4 is a partial sectional view like FIG. 3 and showing the positive clutch in its second operative position.
Figure 5:
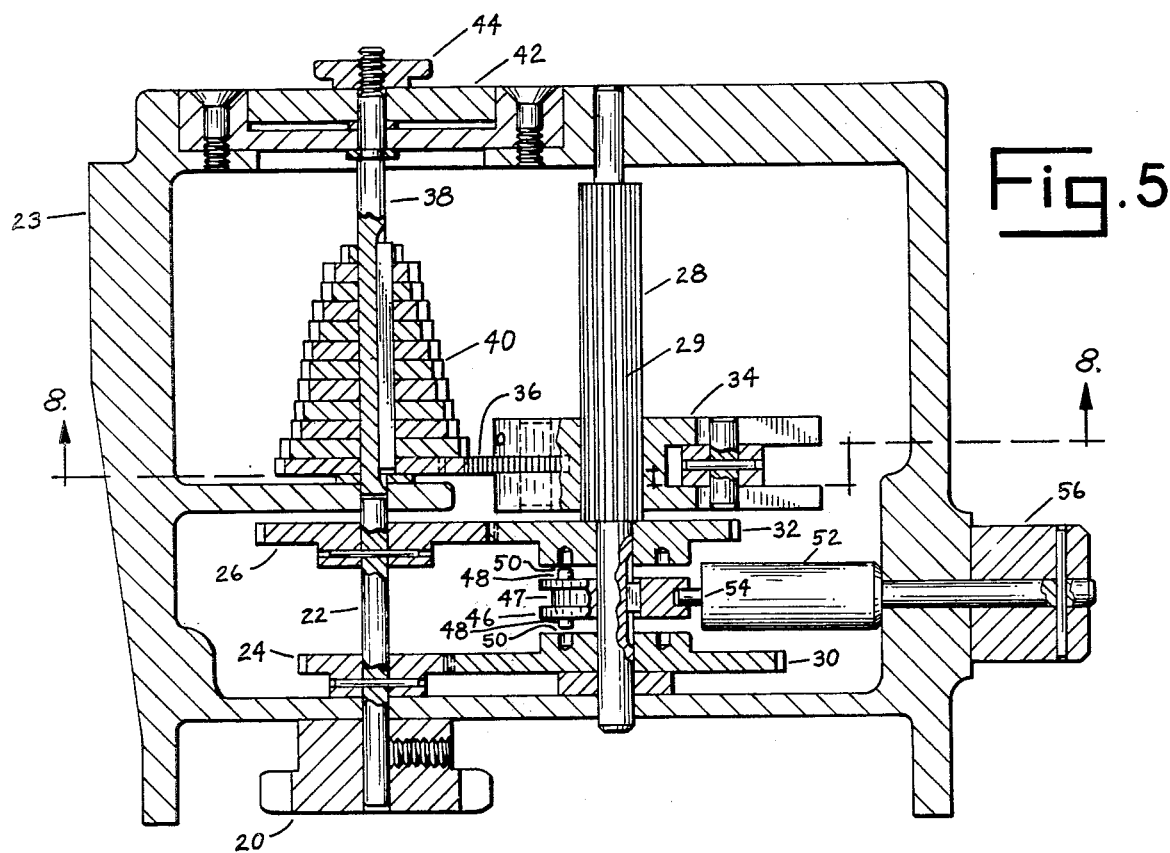
FIG. 5 is a sectional elevational view like FIG. 3 and showing the positive clutch in its non-operative position.
Figure 6:
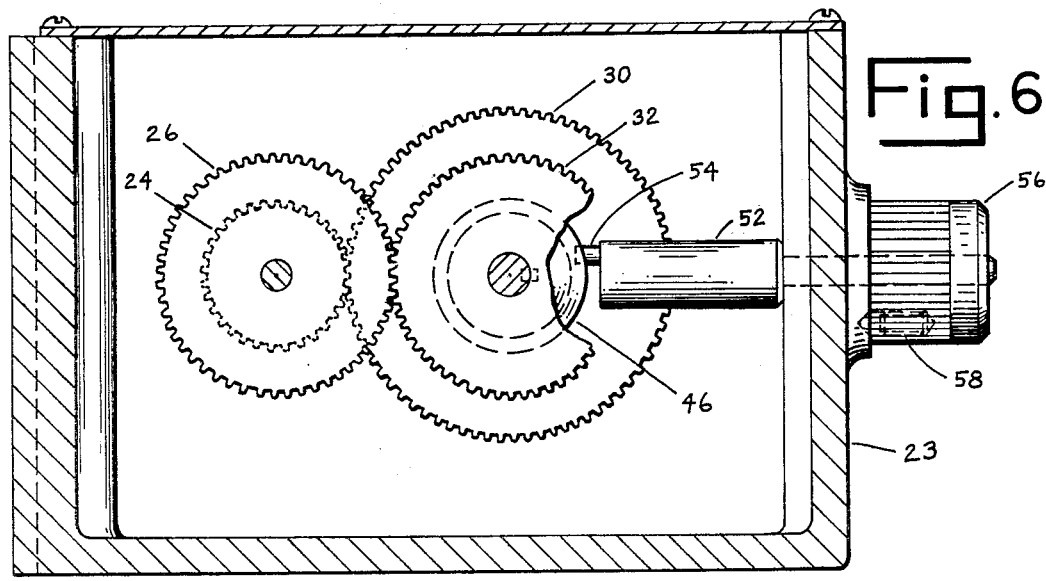
FIG. 6 is a sectional plan view of the invention taken along line 6—6 of FIG. 3 and shown with a gear broken away for purposes of illustration.
Figure 7:
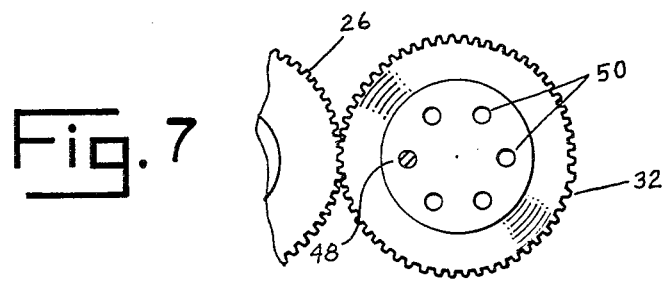
FIG. 7 is a partial sectional plan view taken along line 7—7 of FIG. 3.

With reference to FIG. 3, positive-clutch disc 46 is keyed to shaft 28 and may be moved axially between gear 30 and gear 32. Disc 46 has a clutch pin 48 extending axially from each face. A pin 48 will engage a hole 50 in either gear 30 or gear 32 depending upon the direction of axial movement of disc 46 to interlock the engaged gear with shaft 28. A selector shaft 52 is journaled for rotation within housing 23. Shaft 52 extends transversely to shaft 28 and terminates at disc 46 in an eccentric pin 54. Eccentric pin 54 extends into an annular groove 47 in the periphery of disc 46. By rotation of knob 56 connected to shaft 52, the shaft will rotate and through eccentric pin 54 cause disc 46 to shift between positions of engagement with gears 32 and 30, as shown in FIGS. 3 and 4. In FIG. 5, disc 46 is shown in an intermediate position and engaging neither gear 30 nor 32. Selector shaft knob 56 carries a spring-loaded detent 58 (see FIG. 6) for selectively retaining disc 46 in a position of engagement with gear 30 (setting II), with gear 32 (setting I), or in a neutral position (setting N), as shown in FIG. 2.

Figure 8:
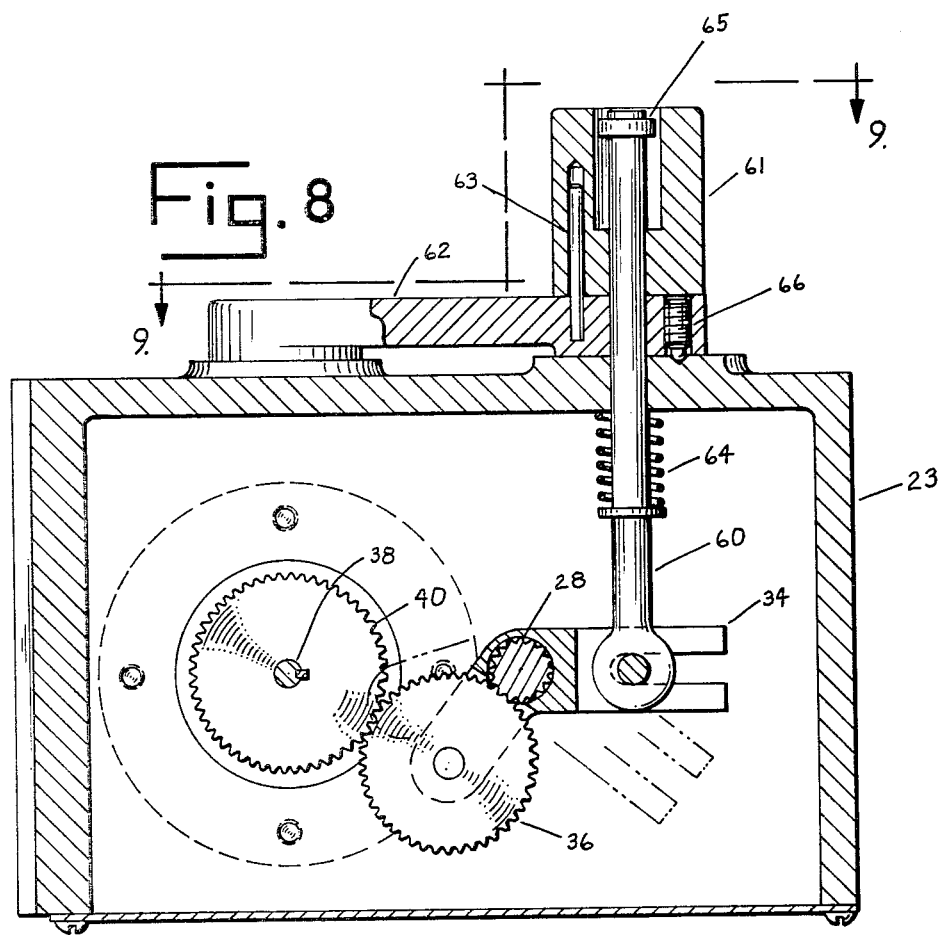
FIG. 8 is a sectional plan view taken along line 8—8 of FIG. 5 and showing the gear change mechanism engaging a gear of the gear cluster.
Figure 9:
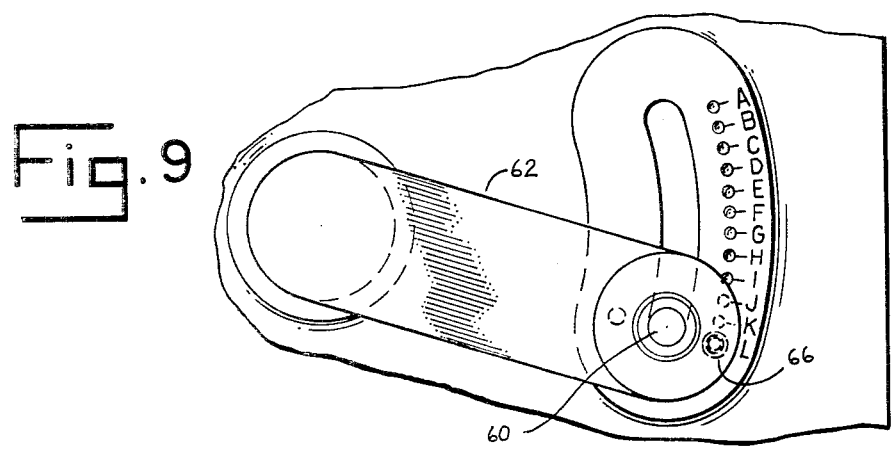
FIG. 9 is a partial view as seen from line 9—9 of FIG. 8 and showing the shift lever positioned along the shift scale at position "L".

In FIG. 8, gear 36 engages one of the multiplicity of spur gears 40 carried upon shaft 38. Yoke 34 is shifted along shaft 28 to enable gear 36 to engage other gears 40 by a shift rod 60. Shift rod 60 is carried by a shift lever 62. A spring 64 urges gear 36 into engagement with one of spur gears 40 on shaft 38 through yoke 34. A spring loaded detent 66 retains shift lever 62 in any one of the selectable positions "A" through "L" as illustrated in FIG. 9. Each one of the positions A through L in FIG. 9 corresponds to the engagement of gear 36 with a different one of the gears 40. Rod 60 is moved axially to pivot yoke 34 about shaft 28 and collapse spring 64, thereby disengaging gear 36 from a gear 40 by pulling upon knob 61. Knob 61, guided by pin 63, shift along rod 60 until it contacts stop 65 at which time the rod is moved axially.

FIG. 10 is a table showing the required settings of selector shaft 52 and shift lever 62 for each of a variety of Metric thread pitches. Also shown is the required indicator marks at which the engagement is to be had between the half-nuts and lead screw 16. As shown in the notation at the bottom of FIG. 10, when using a lathe built for the English system of measurement to cut inch series threads a setting of II-A is employed. This setting maintains a one to one ratio between worm wheel 20 and indicator dial 42. When cutting Metric threads on a lathe built for the English system of measurement, selector shaft 52 and shift lever 62 are set to the position indicated in FIG. 10 for the metric pitch of the thread to be cut.

It is to be understood that the invention is not to be limited to thread dials for English system lathes. This invention applies to engine lathes built to any system of measurement when it is desired to cut screw threads of a different system of measurement on that lathe, for example, the cutting of English inch measurement system threads on a lathe built to the Metric system of measurement.

It is to be understood that the above described invention is not to be limited to the details given but that it may be modified in accordance with the appended claims.

What I claim is:

1. In combination with a lathe having a moveable carriage, a lead screw, and nut means borne by the carriage and engageable with the lead screw for motivating the carriage, a thread dial for said carriage comprising a housing, a worm wheel engaging said lead screw, a first shaft drivingly attached to said worm wheel and journaled for rotation in said housing, a second shaft journaled for rotation in said housing, an indicator dial having indicator marks thereon and journaled for rotation with said second shaft, gear train means for connecting said first shaft with said second shaft and providing a multiplicity of selectively engageable gear ratios, gear shifting means for connecting said first and second shafts through any one of the said gear ratios, a reference mark proximate to said indicator dial whereby said indicator marks may be positioned with respect to said reference mark.

2. The thread dial of claim 1 wherein said gear train means includes a first and a second group of gears, said gear shifting means including a first selector means associated whith said first gear group for selecting a specific gear combination of the first gear group and a second selector means associated with said second gear group for selecting a specific gear combination of the second gear group, said specific gear combinations constituting said one gear ratio.

3. The thread dial of claim 2 wherein said first selector means includes a third shaft jounaled for rotation in said housing and carrying a drive part means rotatable with said third shaft for engaging a selected gear of said first gear group.

4. The thread dial of claim 3 wherein said second selector means includes a positive clutch means connected for rotation with said third shaft for coupling selected gears of said second gear group constituting said specific gear combinations to the third shaft.

5. The thread dial of claim 4 wherein said first gear group is a multiplicity of spur gears fixedly attached to said second shaft, a portion of the said third shaft having longitudinally extending external gear teeth, said drive part including a yoke rotably and slidably positionable along the externally toothed portion of said third shaft and a drive gear carried by said yoke, said drive gear engaging said external gear teeth of the third shaft and a selected one of said multiplicity of spur gears on the second shaft, gear shift rod means associated with said yoke for rotating and sliding the yoke along the toothed portion of said third shaft to engage said drive gear with any of said multiplicity of spur gears, resilient means for urging said drive gear into engagement with said selected one of the multiplicity of spur gears on said second shaft.

6. The thread dial of claim 4 wherein the said second gear group includes a first spur gear and a second spur gear attached to said first shaft, a third spur gear engaging said first spur gear and journaled for rotation on said third shaft, a fourth spur gear engaging said second spur gear and journaled for rotation on said third shaft, said positive clutch means including a disc part drivingly attached to and slidably positionable on said third shaft between said third and fourth spur gears, engagement means in association with said disc and said third and fourth spur gears for optionally engaging said disc part with said third and fourth gears to drivingly connect said first and third shafts through either of said first and third gears or said second and fourth gears, shifting shaft means for slidably positioning said disc part on said third shaft.

7. The thread dial of claim 6 wherein the said engagement means in association with said disc part and said third and fourth spur gears is a plurality of axial holes in the said third and fourth gears adjacent said disc, a pin extending axially from said disc toward said third gear, another pin extending axially from said disc part toward said fourth gear, the said pins receivable in the said holes.

8. The thread dial of claim 6 wherein the said shifting shaft means includes a circumferential groove in said disc part, a selector shaft perpendicular to said third shaft, said selector shaft lying in a plane with said third shaft and journaled for rotation in said housing, said selector shaft having a pin paralleling the axis of the shaft, said pin offset from said shaft axis and extending into said circumferential groove, said selector shaft having means for manually rotating said selector shaft whereby said disc part will be shifted along said third shaft.

9. The thread dial of claim 2 and means for adjustably securing said indicator dial to said second shaft wherein the angular position of the dial relative to the second shaft can be varied.

10. The thread dial of claim 9 wherein said securing means in association with said indicator dial and said second shaft is a thumb screw.

* * * * *